United States Patent
Lehtonen

(10) Patent No.: US 7,356,769 B2
(45) Date of Patent: Apr. 8, 2008

(54) METHOD AND APPARATUS FOR PROVIDING INPUTS TO A COMMUNICATION OR COMPUTING DEVICE

(75) Inventor: Jarmo Lehtonen, Littoinen (FI)

(73) Assignee: Nokia Corporation, Espoo (FI)

( * ) Notice: Subject to any disclaimer, the term of this patent is extended or adjusted under 35 U.S.C. 154(b) by 674 days.

(21) Appl. No.: 10/681,585

(22) Filed: Oct. 7, 2003

(65) Prior Publication Data

US 2005/0073498 A1   Apr. 7, 2005

(51) Int. Cl.
*G06F 3/01* (2006.01)

(52) U.S. Cl. ............... 715/701; 345/161; 345/157; 345/160; 345/179

(58) Field of Classification Search ............... 345/161, 345/160, 157, 179; 715/701, 702
See application file for complete search history.

(56) References Cited

U.S. PATENT DOCUMENTS 6,239,676 B1 *  5/2001  Maloney et al. ............... 335/6
6,239,786 B1 *  5/2001  Burry et al. ............... 345/161
6,806,865 B2 * 10/2004  Oueslati et al. ............... 345/161
2001/0015720 A1 *  8/2001  Inukai ............... 345/161
2003/0125094 A1 *  7/2003  Hyun et al. ............... 455/566
2005/0073496 A1 *  4/2005  Moore et al. ............... 345/156

* cited by examiner

*Primary Examiner*—Tadesse Hailu
*Assistant Examiner*—Haoshian Shih
(74) *Attorney, Agent, or Firm*—Ware Fressola Van Der Sluys & Adolphson LLP

(57) ABSTRACT

A miniaturized user input device or input button (14) for a computing or communication device, such as a personal digital assistant device or a mobile phone. A user provides inputs to the computing or communication device by inserting an end (12) of a pen or other indicator instrument (11) into a receptacle (14*a*) of the input button (14) and applying a force, as a result of which the input button (14) actually or only barely perceptibly moves or deforms. Sensors (14*b-c*) proximate to the input button (14) detect the moving or deforming and provide signals corresponding the moving or deforming, and so corresponding to the user input.

18 Claims, 4 Drawing Sheets

METHOD AND APPARATUS FOR PROVIDING INPUTS TO A COMMUNICATION OR COMPUTING DEVICE

TECHNICAL FIELD

The present invention pertains to the field of user interfaces for computing or communication devices, such as wireless terminals. More particularly, the present invention pertains to a miniature user input device for such a device, and in particular for a hand-held device.

BACKGROUND ART

Existing solutions for scroll and navigation key mechanics of small/miniature user input devices for computing or communication devices, such as for mobile phones, are not fulfilling design and conceptual or usability requirements.

What is still needed is a flexible and miniature-sized control solution for all kinds of smaller computing or communication devices, and especially hand-held computing or communication devices.

DISCLOSURE OF THE INVENTION

Accordingly, in a first aspect of the invention, an apparatus is provided for use in providing user inputs to a communication or computing device, characterized by: an input button lying in or on a surface of the communication or computing device and having a receptacle for receiving a distal end of an indicator instrument, for moving or deforming in response to a force exerted on the input button using the indicator instrument; and means for detecting the force exerted on the input button based on the moving or deforming of the input button in response to the force, and for providing a signal corresponding to the force.

In accord with the first aspect of the invention, the means for detecting the force exerted on the input button may comprise a strain sensor.

Also in accord with the first aspect of the invention, the means for detecting the force exerted on the input button may comprise a sensor that transmits a signal corresponding to the force at least in respect to the direction of the force.

Also in accord with the first aspect of the invention, the means for detecting the force exerted on the input button may comprise a sensor that transmits a signal corresponding to the force at least in respect to the magnitude of the force.

Also in accord with the first aspect of the invention, the means for detecting the force exerted on the input button may comprise a sensor that transmits a signal until the force is removed.

Also in accord with the first aspect of the invention, the input button may move or deform so as to communicate to the means for detecting the force exerted on the input button a signal corresponding to a user action selected from the set consisting of clicking, scrolling, selecting, pointing, cursor positioning, key pressing or typing, and joystick manipulating.

Also in accord with the first aspect of the invention, the input button may move or deform so as to communicate a force lying along the surface of the communication or computing device.

Also in accord with the first aspect of the invention, the input button may moves or deform so as to communicate a force directed orthogonally to the surface of the communication or computing device.

Also in accord with the first aspect of the invention, the input button may move or deform so as to communicate a force couple tending to cause a change in pitch of the input button relative to the surface of the communication or computing device.

Also in accord with the first aspect of the invention, the input button and means for detecting the force exerted on the input button may be in combination provided as a box-in-box construction including an outer box (51) and an inner box (52), the inner box (52) having a receptacle formed so as to allow inserting into it a distal end of the indicator instrument, and the outer box having sensing means responsive to forces applied to the inner box via the distal end of the indicator instrument, for providing a corresponding signal indicating a user input.

In a second aspect of the invention, a method is provided for enabling a user to make user inputs to a communication or computing device, characterized by: having a receptacle of an input button lying in or on a surface of the communication or computing device receive a distal end of an indicator instrument; and having the input button move or deform in response to a force or a force couple exerted on the input button via the distal end of the indicator instrument.

In accord with the second aspect of the invention, the moving or deforming of the input button may be a sliding motion.

Also in accord with the second aspect of the invention, the moving or deforming of the input button may be a rocking motion.

Also in accord with the second aspect of the invention, the moving or deforming of the input button may be a motion into or out of the surface of the communication or computing device.

Also in accord with the second aspect of the invention, the moving or deforming of the input button may be a motion substantially in the plane of the surface of the communication or computing device.

Also in accord with the second aspect of the invention, the indicator instrument may be used to provide user inputs that would otherwise be provided using a keyboard.

One advantage of the invention is that because it saves space in providing a user input means for a device, it allows having a larger display for the device, which is certainly advantageous generally, but is especially so for gaming devices.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1A:
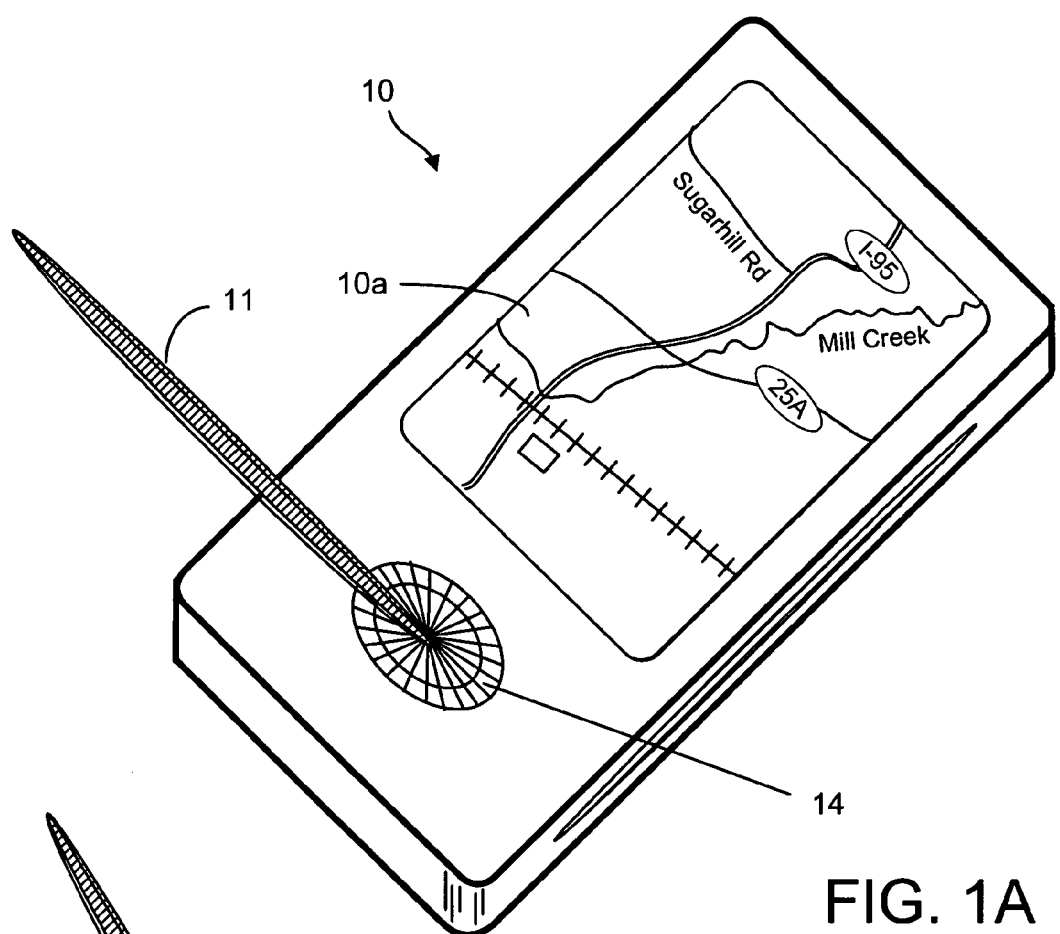
FIGS. 1A and 1B are perspective drawings of a miniature user input device for a hand-held device, according to the invention, including a pen and a control indicator including a notch making it possible to apply various forces to the control indicator using the pen, with different forces corresponding to different input commands.
Figure 1B:
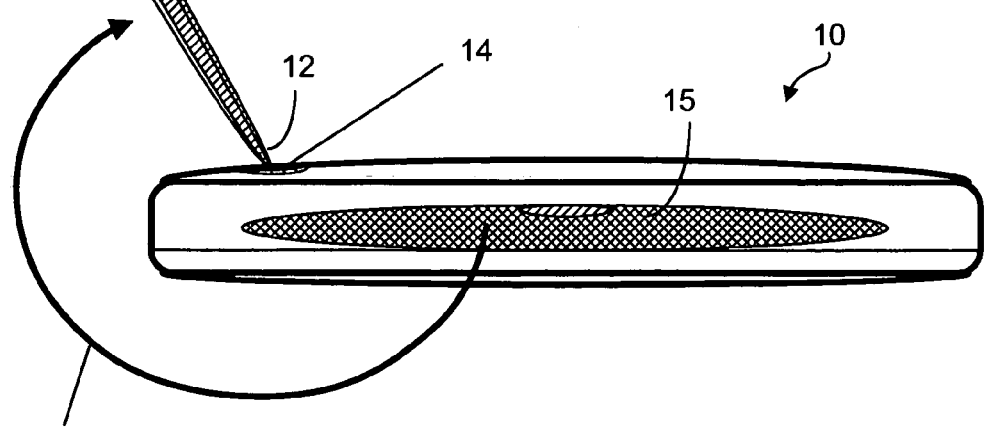

Referring now to FIGS. 1A and 1B, a device 10 is shown having a display screen 10*a*; the device 10 can be either a hand-held communication device (such as a mobile phone) or a hand-held computing device (such as a personal digital assistant), or can be any relatively small communication or computing device, including e.g. a WAP (wireless access protocol) based device, a GPS (global positioning system) receiver device, an office communication or computing tool, a camera, a Bluetooth device, a gaming device, or any device that requires user input. The device 10 is shown including an elongated indicator instrument 11 in the shape of a pen, and so having a pointed end 12. The device 10 also includes a miniaturized user input device 14, called here an input button, for enabling a user to provide inputs to the device 10, inputs that are similar to what is provided using either a mouse with a personal computer—and so based on moving a pointer (not shown) to a point on the screen 10*a* and providing one or another input corresponding to clicking a mouse or dragging an object with the mouse or scrolling with the mouse—or using a joystick with a personal computer or game device. The use of the elongated indicator instrument 11 to move the pointer, to click, to scroll, to drag, and to function as a joystick are described below in connection with FIGS. 3 and 4.

To eliminate some scrolling/pointer repositioning via the input button 14, the screen 10*a* can be a touchscreen. Also, whether or not the screen 10*a* is a touchscreen, the need for a keyboard can be eliminated by displaying a keyboard facsimile on the screen 10*a*, and providing for the user to press a key on the keyboard facsimile by either touching the screen at a point corresponding to a key on the keyboard facsimile, or by positioning the pointer associated with the input button 14 and clicking, in the manner described below in connection with FIGS. 3 and 4.

Instead of including the indicator instrument 11, the invention also encompasses embodiments in which an ordinary pen or pencil or other similar object is used as the indicator instrument 11 with the device 10. In embodiments in which the device 10 includes the indicator instrument 11, it also can include an indicator holder means 15, what might be called a pen park, such as an arrangement in which the indicator instrument 11 can be pressed onto a holder which then snaps closed to hold the indicator instrument, and later removed from the holder means, as indicated in FIG. 1B by arrow 16, in order to provide inputs via the input button 14. The indicator holder means 15 can be provided in various forms, and can be provided either on the outside of the device 10 (such as in case of an external snap on pen park) or integrated inside a cover of the device.

Figure 2A:
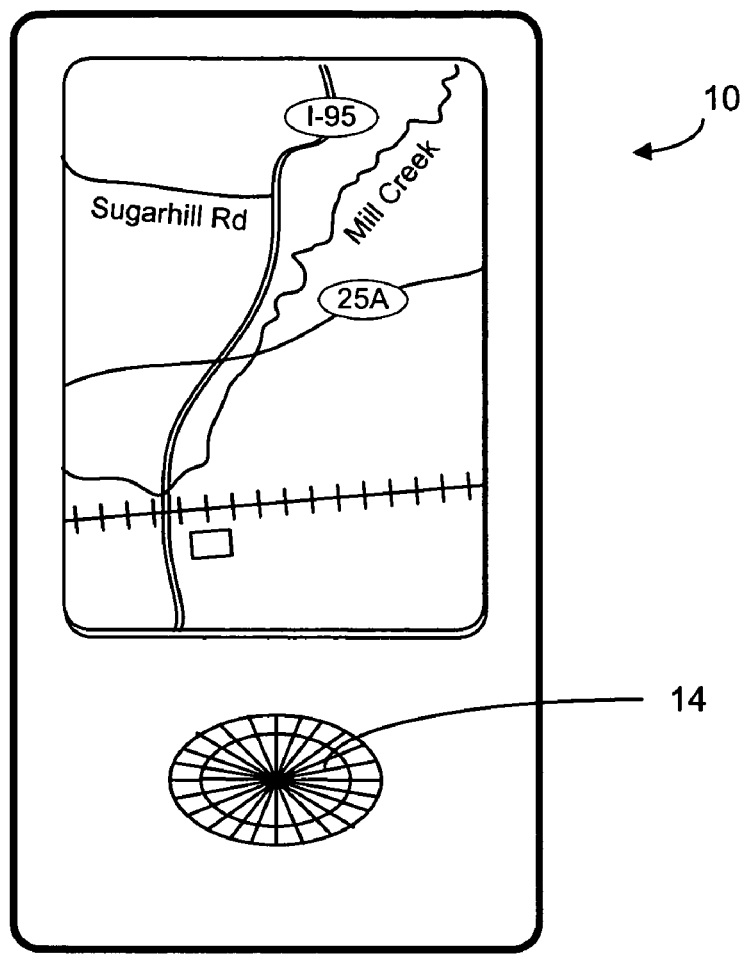
FIGS. 2A and 2B are both another perspective view of the hand-held device of FIGS. 1A and 1B.
Figure 2B:
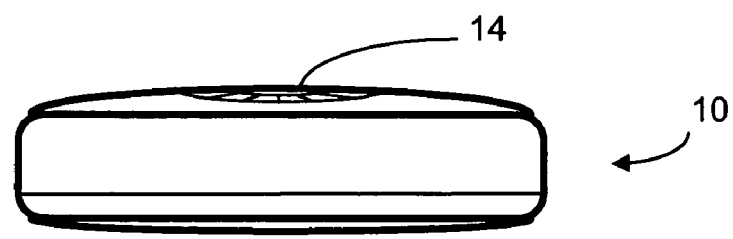

Referring now to FIGS. 2A and 2B, the device 10 is shown from other views, and in particular, FIG. 2B shows that the input button 14 is a low-profile device, and preferably either flush with or recessed below the adjacent surface of the device 10.

Figure 3:
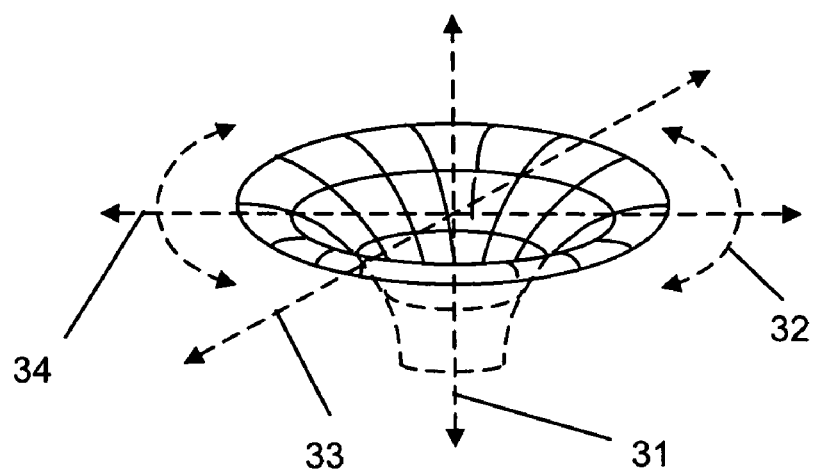
FIG. 3 is a closer view of the miniature user input device of FIGS. 1A and 1B, showing different kinds of movement the input device can be caused to undergo using the control indicator.

Referring now to FIG. 3, the input button 14 is shown as being provided so as to have several degrees of freedom, as indicated by motion arrows 31-34. The input button 14 can move or otherwise respond to forces that would cause sliding along the surface of the device 10, as indicated by motion arrows 33 34 both lying in the plane of the surface of the device 10. In addition, it can move in a direction orthogonal to the surface of the device 10, as indicated by motion arrow 31. Finally, it can be made to rock or pitch (slightly) with respect to the surface of the device 10, as indicated by motion arrow 32. To cause such motion (or to only apply forces that would cause such motion), the tip 12 of the indicator instrument 11 is inserted into a cavity/recess or receptacle 14*a* in the input button 14, and then manipulated to cause the desired motion or to impress the desired force.

The device 10 can be adapted to respond to either actual motion or forces caused as described above (in connection with FIG. 3) in various ways, including e.g. using strain sensors embedded in the device 10 proximate to the input button 14 so as to sense either motion of the input button 14 or strain (a possibly only barely sensible motion) caused by manipulation of the indicator instrument 11.

Figure 4:
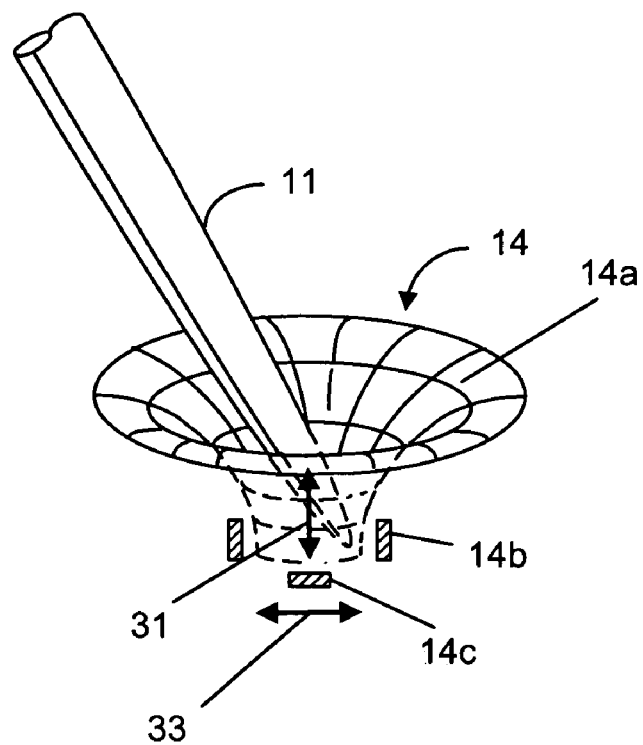
FIG. 4 is a perspective view of a possible embodiment of the miniature user input device of FIGS. 1A and 1B.

Referring now to FIG. 4, a possible embodiment of the input button 14 is shown: a strain-sensor based embodiment. In such an embodiment, the elongated indicator instrument 11 is inserted into the receptacle 14*a* of the input button 14 and manipulated to cause one or another force or combination of forces (couples) so as to cause either actual motion or strain corresponding to motion arrows 31-34 (FIG. 3), i.e. to cause an actual or perhaps possibly only an imperceptible change in the pitch of the input button 14. To cause the rocking or pitch motion, the indicator instrument is caused to simultaneously push down on one side (the side away from the tip of the instrument) and push up and away on the opposite side (the side touched by the tip of the instrument), thus impressing a couple or rotational force. To cause a sliding motion or corresponding strain, a user simply pushes the indicator instrument 11 toward or away from the user, without exerting a couple or rotational type of force. Also shown in FIG. 4 are motion or strain sensors 14*b-c* for sensing actual motion or merely strain caused by a user manipulating the indicator instrument 11. Sensors 14*b* for sensing forces corresponding to (a possible linear combination of) motion arrows 33 34 (i.e. motion along the surface of the device 10) and also for detecting force couples corresponding to motion arrow 32 are shown disposed near the sides of the receptacle 14*a* (as opposed to at the bottom of the receptacle). Sensor 14*c* is shown disposed beneath the receptacle, and so is used for sensing forces corresponding to motion arrow 31. The sensor outputs (not shown) are provided to a microprocessor (also not shown) where they are interpreted to determine what is being indicated via the indicator instrument 11; circuitry or logic for interpreting the sensor outputs can be based on circuitry or logic used to determine user inputs using a mouse and user inputs using a joystick.

Besides strain sensors, other means for detecting forces exerted on the input button 14 using the indicator instrument 11 can be used. Strain sensors are especially advantageous for embodiments in which the input button 14 actually barely moves or deforms. For embodiments in which the input button 14 moves or deforms sensibly (i.e. so that a user can easily notice the input button 14 moving or deforming under forces exerted via the indicator instrument 11), other mechanisms can be more advantageous for detecting forces exerted on the input button 14. For example, the input button can be allowed a range of motion according to each of the various degrees of freedom indicated by motion arrows 31-34 of FIG. 3, so that if a user for example pushes on the input button it moves at most to a maximum possible displacement in the direction pushed, and depending on how far it is pushed, a signal of some strength is transmitted by a corresponding sensor, and the signal continues until the force is removed (so that the input button is once again at a neutral position). In embodiments in which the input button moves or deforms less sensibly (perhaps nearly or actually imperceptibly), the force-detecting sensors (typically strain sensors in such embodiments) can also be adapted to transmit a signal corresponding to an applied (via the indicator instrument) force so that the signal continues until the force is removed, and can even be adapted to vary the amplitude of the signal in proportion to the strength of the applied force (i.e. in proportion to how hard a user pushes on the indicator instrument).

In some embodiments in which the input button moves or deforms sensibly, it is advantageous to provide a means of applying a restoring force to the input button, so that once the indicator instrument 11 is removed from the receptacle 14a, or at least once the user stops applying force using the instrument indicator, the input button returns automatically to its neutral position, at which position, depending on the embodiment, no signal would be provided by any of the sensors of the input button.

Figure 5:
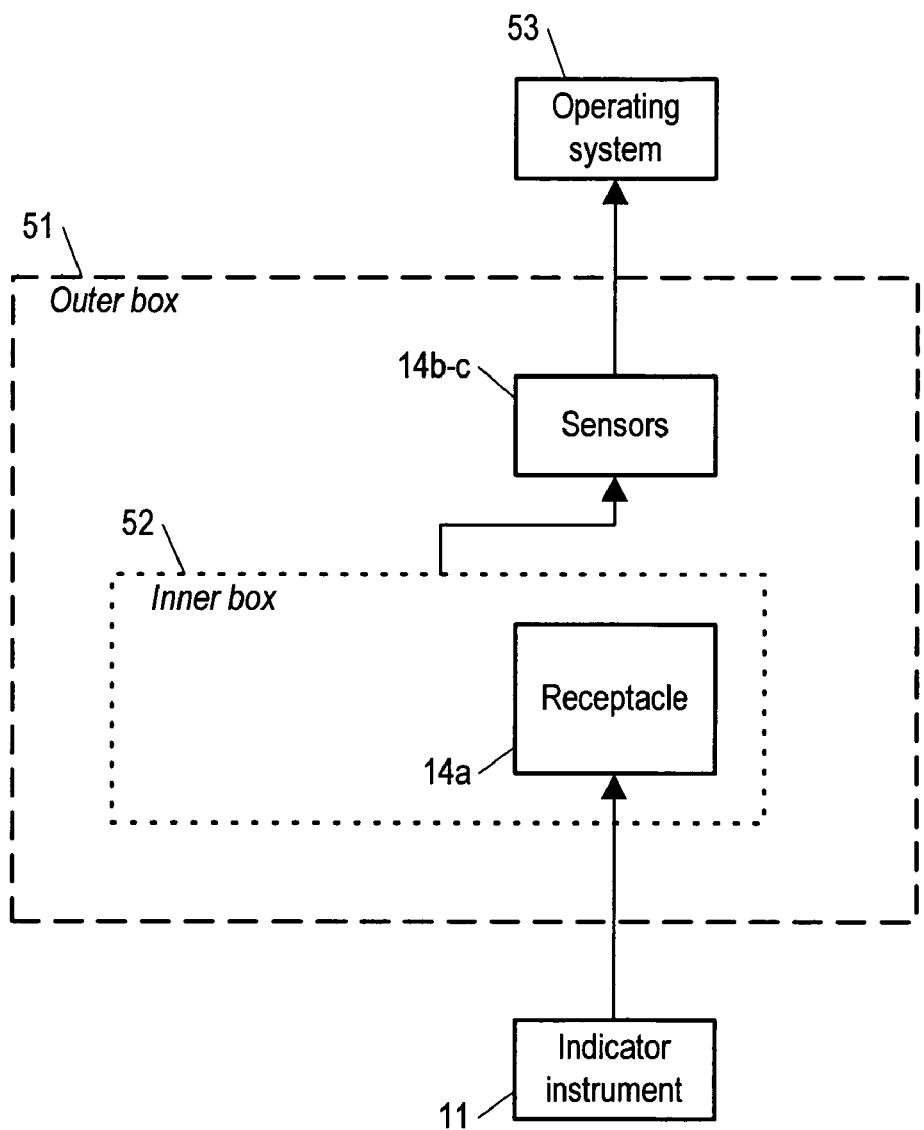
FIG. 5 is a block diagram of a box-in-box type of construction of a miniature user input device according to the invention.

Referring now to FIG. 5, the construction of the input button 14 could be for example a box-in-box type of construction, i.e. an assembly including an outer box 51 and another, inner, box 52 built into the outer box. The outer box would be fixed (stationary) mechanically—and include sensors/indicators for movement/force/placement. The inner box would receive the end of the indicator instrument 11 and move or otherwise respond to a force applied via the end of the indicator instrument 11, and the sensors of the outer box would recognize the movement or other response of the inner box to the applied force and provide a corresponding signal, which would then be made to correspond to a user input by an operating system 53 (or at least a user input module of an operating system), usually resulting in a change in what is displayed on the screen 10a of the device 10, a change such as a change in the position of a pointer or blinking cursor, for example.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus for use in providing user inputs to a communication or computing device, comprising:
an input button provided as a flattened shape lying in or on and nearly flush with a surface of the communication or computing device so as to have an exposed surface and having a receptacle formed on the exposed surface for receiving an end portion of an indicator instrument; and
means disposed proximate to the receptacle for detecting a force exerted on the input button via the indicator instrument based on the input button moving or deforming in response to the force, and for providing a signal corresponding to the force, said means comprising motion or strain sensors disposed on opposite sides of the input button and configured to detect a rotational force, said rotational force caused by the indicator instrument simultaneously pushing down on one side and pushing up and away on an opposite side.

2. An apparatus as in claim 1, wherein the means for detecting the force exerted on the input button comprises a sensor array that transmits a signal corresponding to the force at least in respect to the direction of the force.

3. An apparatus as in claim 1, wherein the means for detecting the force exerted on the input button comprises a sensor array that transmits a signal corresponding to the force at least in respect to the magnitude of the force.

4. An apparatus as in claim 1, wherein the means for detecting the force exerted on the input button comprises a sensor array that transmits a signal until the force is removed.

5. An apparatus as in claim 1, wherein the input button moves or deforms so as to communicate to the means for detecting the force exerted on the input button a signal corresponding to a user action selected from the set consisting of clicking, scrolling, selecting, pointing, cursor positioning, key pressing or typing, and joystick manipulating.

6. An apparatus as in claim 1, wherein the input button is provided so as to move or deform in response to a force lying along the surface of the communication or computing device.

7. An apparatus as in claim 1, wherein the input button is provided so as to move or deform in response to a force directed orthogonally to the surface of the communication or computing device.

8. An apparatus as in claim 1, wherein the input button is so shaped as to allow imparting a rotational force via the indicator instrument and so tending to cause a change in pitch of the input button relative to the surface of the communication or computing device, and wherein the input button moves or deforms in response to the rotational force.

9. An apparatus as in claim 1, wherein the input button and means for detecting the force exerted on the input button are in combination provided as a box-in-box construction including an outer box and an inner box, the inner box provided as the flattened shape having the indention formed on the exposed surface, and the outer box having sensing means responsive to forces applied to the inner box via the end portion of the indicator instrument, for providing a corresponding signal indicating a user input.

10. A method for acquiring user inputs to a communication or computing device, comprising:
receiving an end portion of an indicator instrument in a receptacle of an input button lying in or on a surface of the communication or computing device, wherein the input button is a flattened shape lying in or on and nearly flush with a surface of the communication or computing device so as to have an exposed surface and having the receptacle formed on the exposed surface for receiving the end portion of the indicator instrument, and wherein the input button moves or deforms in response to forces exerted on the input button via the end portion of the indicator instrument; and
providing a signal indicative of rotation using motion or strain sensors disposed on opposite sides of the input button and configured to detect a rotational force applied to the input button via the indicator instrument, said rotational force caused by the indicator instrument simultaneously pushing down on one side and pushing up and away on an opposite side.

11. The method of claim 10, further comprising providing a signal indicative of a sliding motion of the input button.

12. The method of claim 10, wherein the moving or deforming of the input button includes a rocking motion.

13. The method of claim 10, further comprising providing a signal indicative of a motion of the input button into or out of the surface of the communication or computing device.

14. The method of claim 10, further comprising providing a signal indicative of a motion of the input button substantially in the plane of the surface of the communication or computing device.

15. The method of claim 10, wherein the indicator instrument is used to provide user inputs that would otherwise be provided using a keyboard.

16. An apparatus as in claim 9, wherein the inner box is so shaped as to allow imparting a rotational force via the indicator instrument and so tending to cause a change in pitch of the input button relative to the surface of the communication or computing device, and wherein the sensing means are for providing a signal indicative of the rotational force.

17. A communication or computing device comprising an apparatus as in claim 1, and further comprising the indicator instrument and an indicator holder for storing the indicator when the indicator is not in use, wherein the indicator holder is attached to the side of the communication or computing device or integrated into a cover for the communication or computing device, and is shaped so as to allow snapping to a holding position when the indicator is pressed onto the holder.

18. An apparatus for use in providing user inputs to a communication or computing device, comprising:
- an input button provided as a flattened shape lying in or on and nearly flush with a surface of the communication or computing device so as to have an exposed surface and having a receptacle formed on the exposed surface for receiving an end portion of an indicator instrument unattached to the input button, and for receiving a force exerted on the input button via the indicator instrument; and
- a sensor array disposed proximate to the receptacle for detecting the force exerted on the input button based on the input button moving or deforming in response to the force, and for providing a signal corresponding to the force, said sensor array comprising motion or strain sensors disposed on opposite sides of the input button and configured to detect a force couple applied to the indicator instrument tending to cause a rotation of the indicator instrument, said rotation caused by the indicator instrument simultaneously pushing down on one side and pushing up and away on an opposite side.

* * * * *